(12) United States Patent  (10) Patent No.: US 7,686,488 B2
Inoue et al.  (45) Date of Patent: Mar. 30, 2010

(54) VEHICLE LAMP AND VEHICLE LAMP SYSTEM

(75) Inventors: Takashi Inoue, Shizuoka (JP); Seiichiro Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 455 days.

(21) Appl. No.: 11/442,862

(22) Filed: May 30, 2006

(65) Prior Publication Data

US 2006/0274544 A1  Dec. 7, 2006

(30) Foreign Application Priority Data

Jun. 6, 2005  (JP)  ............................. 2005-165937

(51) Int. Cl.
*F21V 1/00* (2006.01)
(52) U.S. Cl. .................. 362/509; 362/507; 362/538; 362/544; 362/373; 362/547; 362/294; 362/345; 362/545; 362/487; 362/475
(58) Field of Classification Search ................. 362/509, 362/507, 538, 544, 373, 547, 294, 345, 475, 362/545, 487
See application file for complete search history.

(56) References Cited

U.S. PATENT DOCUMENTS 5,140,504 A * 8/1992 Sato ............................ 362/517
6,152,590 A * 11/2000 Furst et al. ................... 362/545
2004/0202007 A1* 10/2004 Yagi et al. ..................... 362/545
2005/0052878 A1* 3/2005 Yamada et al. ............... 362/460
2005/0094413 A1* 5/2005 Sazuka et al. ................ 362/544

FOREIGN PATENT DOCUMENTS

DE  102 14 447 A1  10/2003
DE  10 2004 017 454 A1  1/2005
JP  2004-311224  11/2004

OTHER PUBLICATIONS

Patent Abstracts of Japan, Publication No. 2004-311224, Publication Date: Nov. 4, 2004, 2 pages.
German Office Action issued in German Application No. 10 2006 025 997.1-54 dated Nov. 9, 2007 and English translation thereof, 6 pages.

* cited by examiner

*Primary Examiner*—Sandra L O'Shea
*Assistant Examiner*—Jessica L McMillan
(74) *Attorney, Agent, or Firm*—Osha • Liang LLP (57) ABSTRACT

Five lamp units with light emitting elements are supported by a common metal made support member. Heat generated by the respective light emitting elements is transferred to the metal made support member having a large heat capacity to restrain a temperature rise thereof. The lamp units including the light emitting elements having a relatively large heat generating amount are arranged on lower sides of the lamp units including the light emitting elements having a relatively small heat generating amount.

8 Claims, 11 Drawing Sheets

VEHICLE LAMP AND VEHICLE LAMP SYSTEM

The present application claims foreign priority based on Japanese Patent Application No. P.2005-165937, filed on Jun. 6, 2005, the contents of which are incorporated herein by reference.

BACKGROUND OF THE INVENTION

1. Field of the Invention

The present invention relates to a vehicle lamp and a vehicle lamp system including a plurality of lamp units with light emitting elements as light sources.

2. Related Art

In vehicle lamps of headlamps or the like, there is a vehicle lamp provided with a plurality of lamp units. Further, in the vehicle lamp, there is a lamp using light emitting elements of light emitting diodes or the like as light sources of respective lamp units.

Disclosed in JP-A-2004-311224 is a vehicle lamp including a plurality of lamp units, each having a light emitting element as a light source. In the vehicle lamp, the plurality of lamp units are supported by a common metal made support member.

When the plurality of lamp units are supported by the common metal made support member as described in JP-A-2004-311224, heat generated by light emitting elements of respective lamp units can be transferred to the metal made support member having a large heat capacity by heat conducting operation, thereby, a temperature rise of the light emitting element can be restrained.

However, when the lamp units having different heat generating amounts of light emitting elements are provided as a plurality of lamp units, even when heat is radiated by the metal made support member as described in JP-A-2004-311224, there may be brought about a situation in which depending on the lamp unit, a temperature of the light emitting element is not sufficiently lowered. Further, according to the light emitting element in a state in which the temperature stays to rise in this way, there poses a problem that a light source light flux is reduced or an emitted light color is changed.

SUMMARY OF THE INVENTION

One or more embodiments of the present invention provide a vehicle lamp and a vehicle lamp system capable of restraining a temperature rise of light emitting elements of respective lamp units in a vehicle lamp including a plurality of lamp units constituting light sources by the light emitting elements.

According to one or more embodiments of the present invention, by devising an arrangement of respective lamp units, in a vehicle lamp in which a plurality of lamp units are supported by a common metal made support member, a temperature rise is restrained.

In accordance with one or more embodiments of the present invention, a vehicle lamp is provided with: a lamp housing including a lamp body and a light transmitting cover attached to a front end opening portion of the lamp body; and a plurality of lamp units constituting light sources thereof by light emitting elements accommodated in the lamp housing. In the vehicle lamp, the plurality of lamp units are supported by a common metal made support member, and the plurality of lamp units include a first and a second lamp units having different heat generating amounts of the light emitting elements. In the vehicle lamp, the first and the second lamp units are arranged to be contiguous to each other in an up and down direction. In the first and the second lamp units, the first lamp unit having a relatively large heat generating amount is arranged on a lower side of the second lamp unit having a relatively small heat generating amount.

A kind of the "vehicle lamp" is not particularly limited but, for example, a headlamp, a fog lamp, a cornering lamp, a tail lamp, a stop lamp, a backup lamp, a turn signal lamp, a daytime running lamp or the like can be adopted.

A kind of the "light emitting element" is not particularly limited but, for example, a light emitting diode, a laser diode or the like can be adopted. Further, a specific constitution of the "light emitting element" is not particularly limited but, for example, the light emitting element may be mounted with a single light emitting chip, or may be mounted with a plurality of light emitting chips.

A specific constitution of the "metal made support member" is not particularly limited so far as the metal made support member is a member made of a metal for supporting the plurality of lamp units. "Metal made" mentioned here includes also an alloy made comprising two kinds or more of metals other than comprising one kind of a metal. Further, the metal made support member may inclinably be supported by a lamp body or the like or may be fixedly supported thereby.

The "plurality of lamp units" may be constructed by a constitution comprising only the first and the second lamp units or may be constructed by a constitution including a lamp unit other than the first and the second lamp units. In the case of the latter, so far as the first and the second lamp units are constituted by the lamp units including light emitting elements having heat generating amounts different from each other, a specific constitution of the other lamp unit is not particularly limited.

"The first and the second lamp units" may not be arranged on the same vertical line so far as the first and the second lamp units are arranged contiguously to each other in an up an down direction.

As shown by the above-described constitution, the vehicle lamp according to the embodiments of the invention is constructed by the constitution of including a plurality of lamp units constituting light sources by the light emitting elements, the plurality of lamp units are supported by a common metal made support member and therefore, even when the light emitting elements generate heat by lighting the respective lamp units, the heat is transferred to the metal made support member having a large heat capacity by heat conducting operation, thereby, a temperature rise of the respective light emitting elements is restrained.

At that occasion, in the vehicle lamp according to the embodiments of the invention, the plurality of lamp units include the first and the second lamp units having different heat generating amounts of the light emitting elements, further, the first and the second lamp units are arranged to be contiguous to each other in the up and down direction, in the first and the second lamp units, the first lamp unit having a relatively large heat generating amount of the light emitting element is arranged on the lower side of the second lamp unit having a relatively small heat generating amount of the light emitting element and therefore, the following operation and effect can be achieved.

That is, when the first lamp unit is lighted, a temperature of the light emitting element is elevated by heat generated by the light emitting element per se, at this occasion, when the first lamp unit is assumedly arranged on an upper side of the second lamp unit, the heat transferred from the light emitting element to the metal made support member by lighting the second lamp unit is transferred to an upper side and therefore, the temperature of the light emitting element of the first lamp unit is elevated also by the heat.

In contrast thereto, in the vehicle lamp according to the embodiments of the invention, the first lamp unit is arranged on the lower side of the second lamp unit and therefore, the temperature of the light emitting element of the first lamp unit is hardly elevated by the heat transferred from the light emitting element of the second lamp unit to the metal made support member. Therefore, it can be prevented beforehand that the temperature of the light emitting element of the first lamp unit is abnormally elevated.

In this way, according to the embodiments of the invention, in the vehicle lamp constituted by including the plurality of lamp units constituting light sources by the light emitting elements, the temperature rise of the light emitting elements of the respective lamp units can be restrained. Further, thereby, with regard to portions of the plurality of lamp units, it can be restrained that the light source light flux of the light emitting element is reduced or an emitted light color is changed.

Moreover, in accordance with one or more embodiments of the present invention, a temperature sensor may be provided at a vicinity of the lamp unit at which a temperature of the light emitting element becomes the highest, and a current can be supplied to the respective lamp units by a predetermined current value in accordance with a detecting temperature of the temperature sensor. In this structure, the temperature of the light emitting elements of the respective lamp units can be prevented from being abnormally elevated beforehand after minimizing a number of pieces of installing the temperature sensors.

Meanwhile, in a case in which a pair of the vehicle headlamps are arranged on two left and right sides of a vehicle body as in, for example, a headlamp, a tail lamp or the like, when a vehicle lamp system is constituted to comprise a left side temperature sensor provided at a vicinity of the lamp unit at which a temperature of the light emitting element becomes the highest in the plurality of lamp units constituting the vehicle lamp on the left side, a right side temperature sensor provided at a vicinity of the lamp unit at which a temperature of the light emitting element becomes the highest in the plurality of lamp units constituting the vehicle lamp on the right side, and a current controller for setting a current supplied to the respective vehicle lamps to a predetermined current value in accordance with a value of a higher one of a detecting temperature of the left side temperature sensor and a detecting temperature of the right side temperature sensor, the following operation and effect can be achieved.

That is, when there is assumedly constructed a constitution in which the temperature sensors and the current controller are provided at respectives of the left and right pair of the vehicle lamps, a current supply control is carried out for the respective vehicle lamps independently from each other and therefore, there is a case in which currents supplied to the respective vehicle lamps are set to different current values. Further, in such a case, brightnesses of the vehicle lamp on the left side and the vehicle lamp on the right side differ from each other and therefore, there is a concern of giving a strange feeling to a driver of a vehicle of one's own or a driver of a vehicle running on an opposed lane or a driver of a succeeding vehicle or the like.

In this respect, when the currents supplied to the respective lamps are set to a predetermined current value in accordance with the value of the higher one of the detecting temperature of the left side temperature sensor and the detecting temperature of the right side temperature sensor, the brightnesses of the vehicle lamp on the left side and the vehicle lamp on the right side can be made to be uniform and therefore, a concern of giving the strange feeling to a driver of a vehicle of one's own or a driver of a vehicle running on an opposed lane or a driver of a succeeding vehicle or the like can be eliminated.

Instead thereof, as a vehicle lamp system, there can be constructed a constitution comprising a temperature sensor provided at a vicinity of the lamp unit at which a temperature of the light emitting element is the highest in the plurality of lamp units constituting the vehicle lamp on the left side and the plurality of lamp units constituting the vehicle lamp on the right side, and a current controller for setting a current supplied to the respective vehicle lamps to a predetermined current value in accordance with a detecting temperature of the temperature sensor.

Also in the case of adopting such a constitution, the brightnesses of the vehicle lamp on the left side and the vehicle lamp of the right side can be made to be uniform and therefore, a concern of giving the strange feeling to a driver of a vehicle of one's own or a driver of a vehicle running on an opposed lane or a driver of a succeeding vehicle or the like can be eliminated.

Further, by adopting such a constitution, a necessary number of pieces of installing temperature sensors can be minimized.

At that occasion, according to the vehicle lamp arranged under an environment in which the temperatures on two left and right sides of a vehicle body differ from each other as in, for example, a headlamp or the like arranged at inside of an engine compartment, there is frequently a case in which the lamp unit at which a temperature of the light emitting element is the highest is fixedly present at one of the left and right vehicle lamps and therefore, it is particularly effective for the case to adopt such a constitution.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
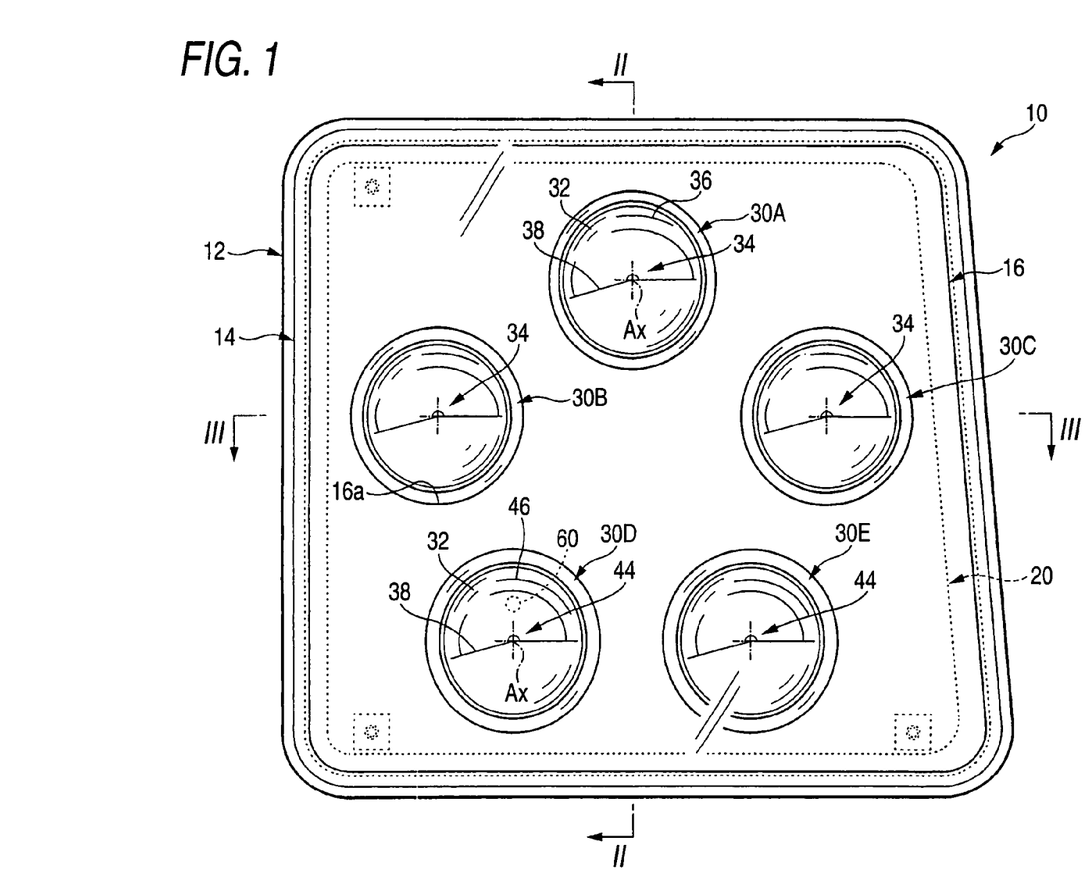
FIG. 1 is a front view showing a vehicle lamp according to an exemplary embodiment of the invention.
Figure 2:
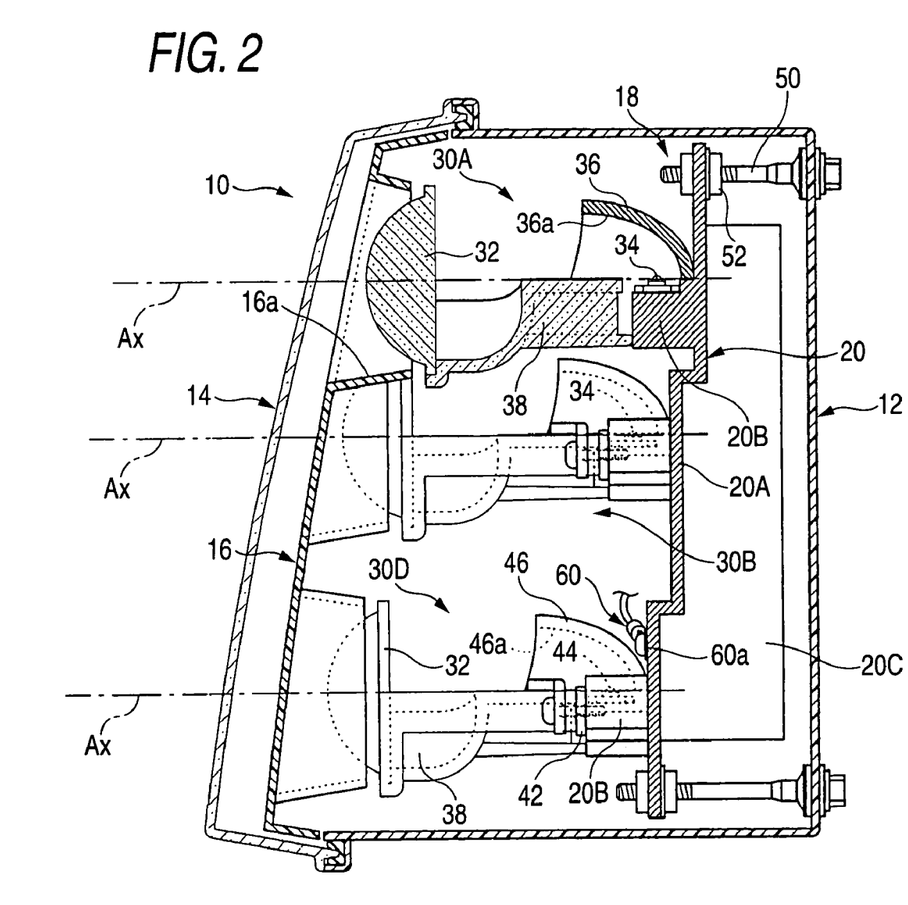
FIG. 2 is a sectional view taken along a line II-II of FIG. 1.
Figure 3:
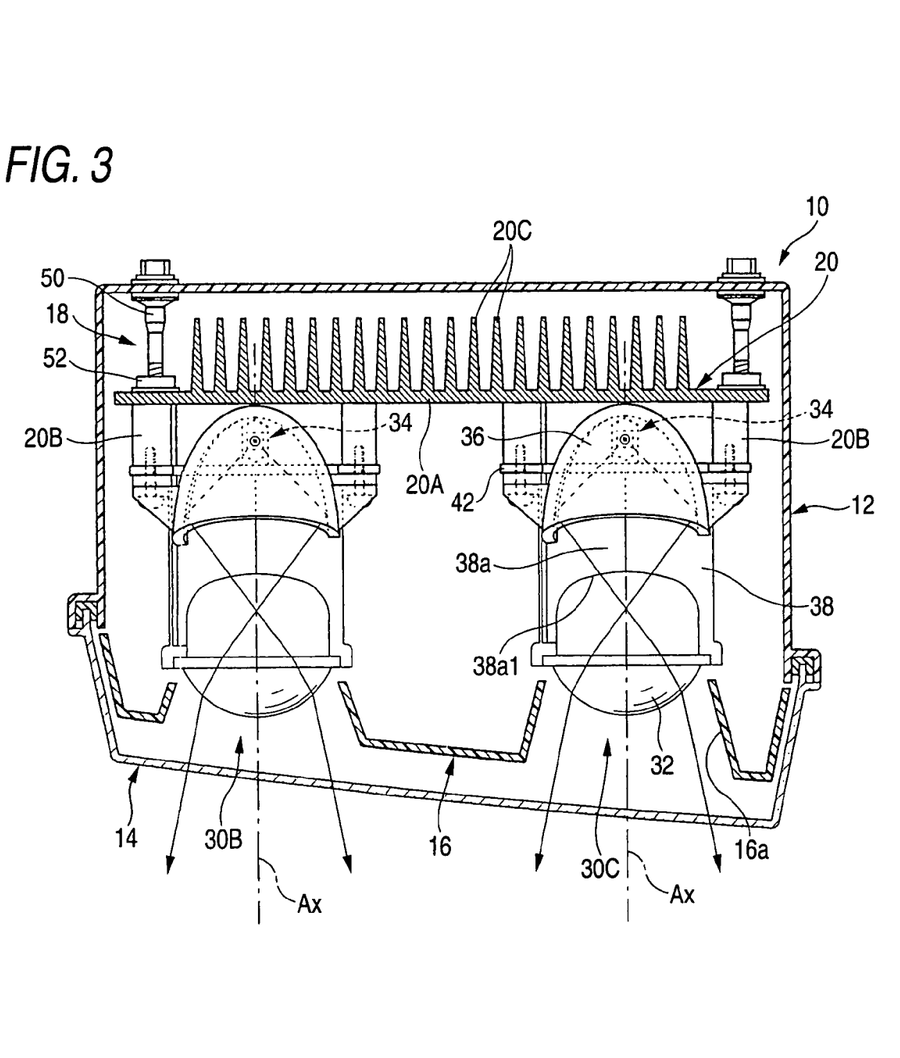
FIG. 3 is a sectional view taken along a line III-III of FIG. 1.

FIG. 1 is a front view showing a vehicle lamp according to an exemplary embodiment of the invention, FIG. 2 is a sectional view taken along a line II-II of FIG. 1, and FIG. 3 is a sectional view taken along a line III-III of FIG. 1.

As shown by the drawings, a vehicle lamp 10 according to the embodiment is a headlamp provided at a right side portion of a front end of a vehicle body and is constructed by a constitution of containing five lamp units 30A, 30B, 30C, 30D, 30E at inside of a lamp chamber formed by a lamp body 12 and a light transmitting cover 14 in a transparent state attached to a front end opening portion thereof. Further, according to the vehicle headlamp 10, a light distribution pattern for a low beam is formed by irradiating light from the five lamp units 30A through 30E.

Inside of the lamp chamber is provided with an inner panel 16 along the light transmitting cover 14 and at positions of the inner panel 16 in correspondence with the respective lamp units 30A through 30E, cylindrical opening portions 16a surrounding the respective lamp units 30A through 30E are respectively formed.

All of the five lamp units 30A through 30E are constituted as lamp units of a projector type and supported by a common metal made support member 20.

The metal made support member 20 is supported by the lamp body 12 by way of an aiming mechanism 18 inclinably in an up and down direction and in a left and right direction.

The aiming mechanism 18 is constituted by including 3 pieces of aiming screws 50. Base end portions of the respective aiming screws 50 are rotatably supported by the lamp body 12, and front end portions thereof are engaged to be connected with the metal made support member 20 by way of aiming nuts 52.

According to the aiming mechanism 18, by pertinently rotating predetermined ones of the aiming screws 50 by a screw driver, the metal made support member 20 is inclined in an up and down direction or in a left and right direction, thereby, optical axes of the five lamp units 30A through 30E are summarizingly adjusted.

Figure 4:
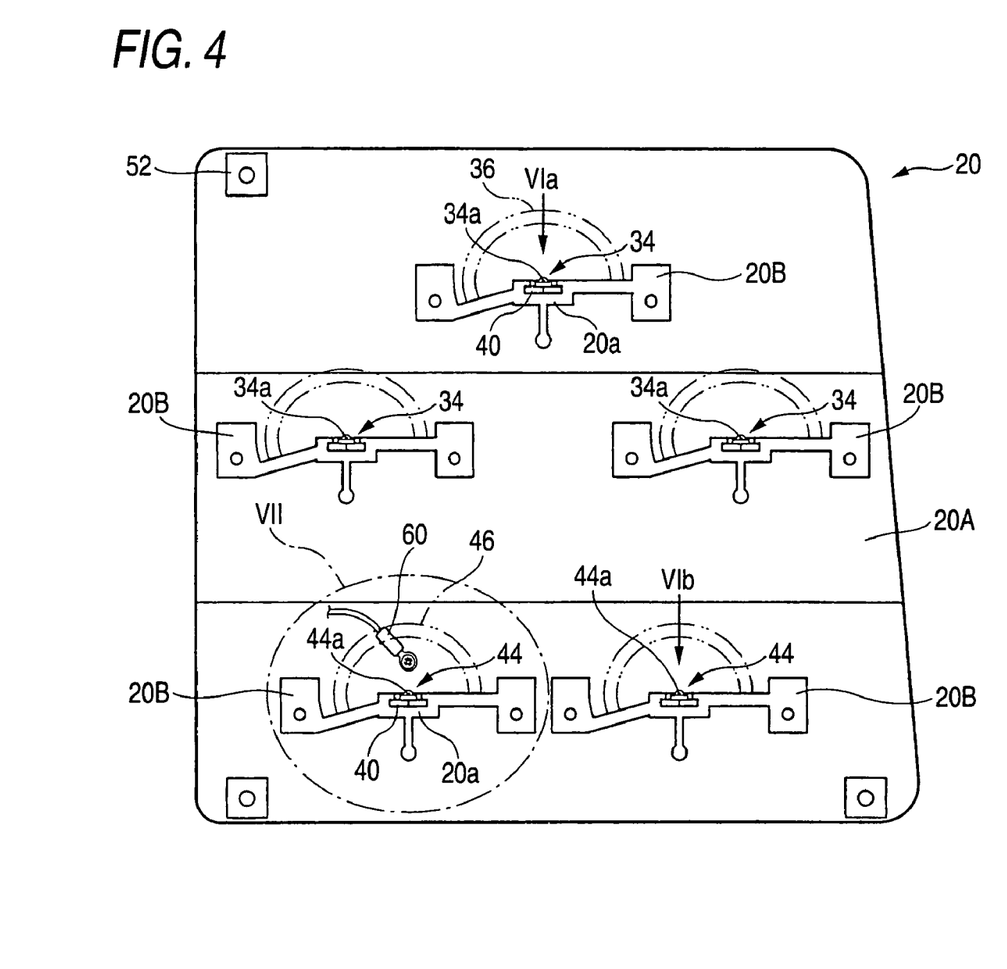
FIG. 4 is a front view showing a metal made support member of the vehicle lamp.

FIG. 4 is a front view showing the metal made support member 20.

As shown also in the drawing, the metal made support member 20 is constituted by a diecast molded product (for example, aluminum diecast molded product or the like) and comprises a vertical panel portion 20A formed in a step-like shape, five unit attaching portions 20B extended in a shelf-like shape to a front side from the vertical panel portion 20A, and a plurality of cooling fins 20C projected from the vertical panel portion 20A to a rear side.

The five unit attaching portions 20B are arranged to be disposed at vicinities of respective apexes of a regular pentagonal shape in a front view of the lamp, one thereof is formed at an upper stage vertical portion of the vertical panel portion 20A, other two thereof are formed at a middle vertical portion of the vertical panel portion 20A, and remaining two thereof are formed at a lower stage vertical portion of the vertical panel portion 20A.

The plurality of cooling fins 20C are formed in a vertical streak shape substantially over an entire region of the vertical panel portion 20A to thereby make the metal made support member 20 function as a heat sink.

The respective lamp units 30A through 30E are fixed to the metal made support member 20 at the respective unit attaching portions 20B. At that occasion, the respective lamp units 30A through 30E are arranged such that the optical axes Ax are extended in parallel with each other in a direction orthogonal to the vertical panel portion 30A. However, the optical axes Ax of the respective lamp units 30A through 30E are set to extend in a downward direction relative to a front and rear direction of the vehicle by about 0.5 through 0.6° at a stage of finishing to adjust the optical axes by the aiming mechanism 18.

Among the five lamp units 30A through 30E, the lamp unit 30A arranged at the upper stage vertical portion of the vertical panel portion 20A and the lamp units 30B, 30C arranged at the middle stage vertical portion of the vertical panel portion 20A are constituted as lamp units for forming a scattering light distribution pattern, on the other hand, the lamp units 30D, 30E arranged at the lower stage vertical portion of the vertical panel portion 20A are constituted as the lamp units for forming a converging light distribution pattern.

Next, specific constitutions of the respective lamp units 30A through 30E will be explained.

First, the constitution of the lamp unit 30A arranged at the upper stage vertical portion of the vertical panel portion 20A will be explained.

Figure 5:
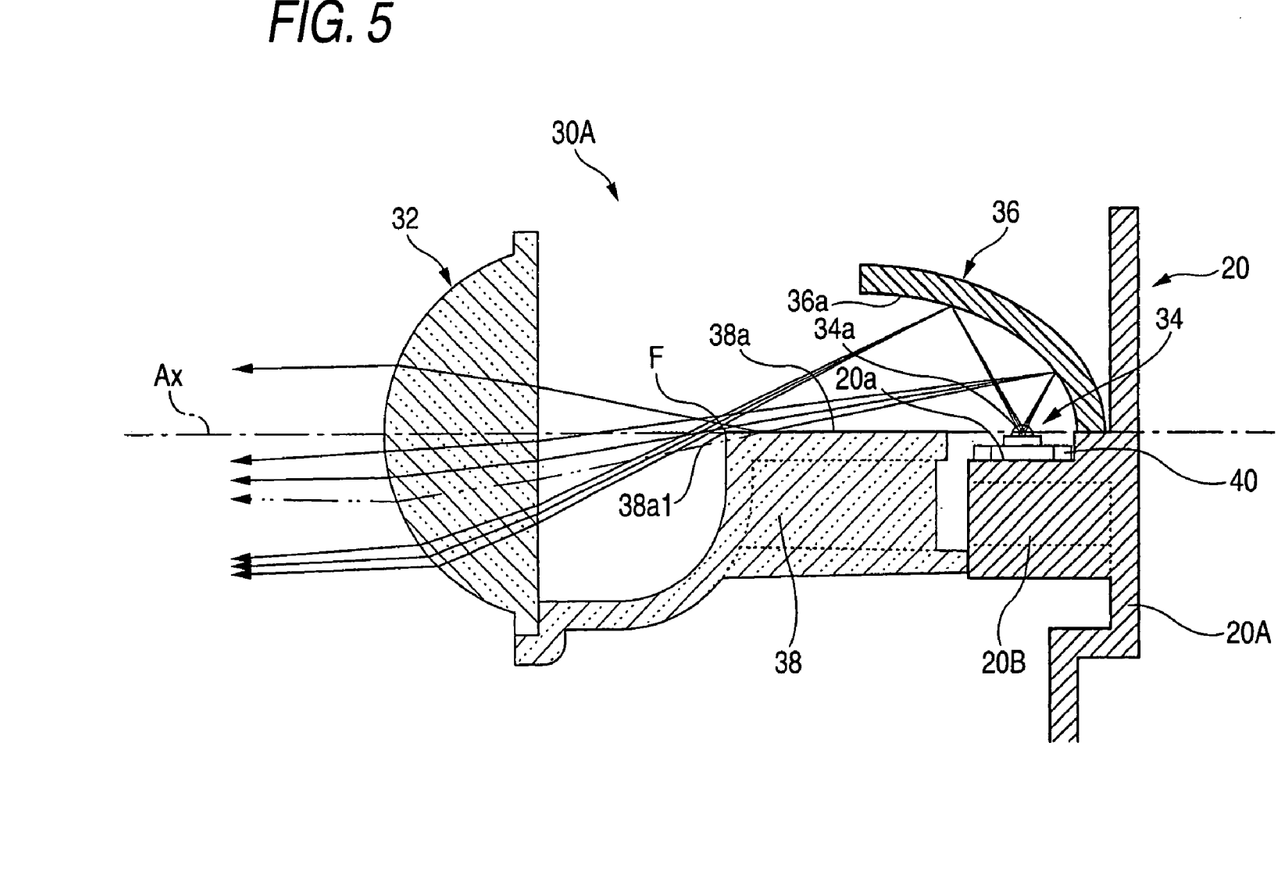
FIG. 5 is a detailed view of an essential portion of FIG. 2.

FIG. 5 is a detailed view of an essential portion of FIG. 2.

As shown by the drawing, the lamp unit 30A is constituted by including a projecting lens 32 arranged on the optical axis Ax, a light emitting element 34 arranged on a rear side of the projecting lens 32, a reflector 36 arranged to cover the light emitting element 34 from an upper side, and a light control member 38 arranged between the light emitting element 34 and the projecting lens 32.

The projecting lens 32 is a lens made of a transparent resin and is constituted as a flat convex aspherical lens having a surface on a front side by a convex face and a surface on a rear side by a flat face.

Figure 6:
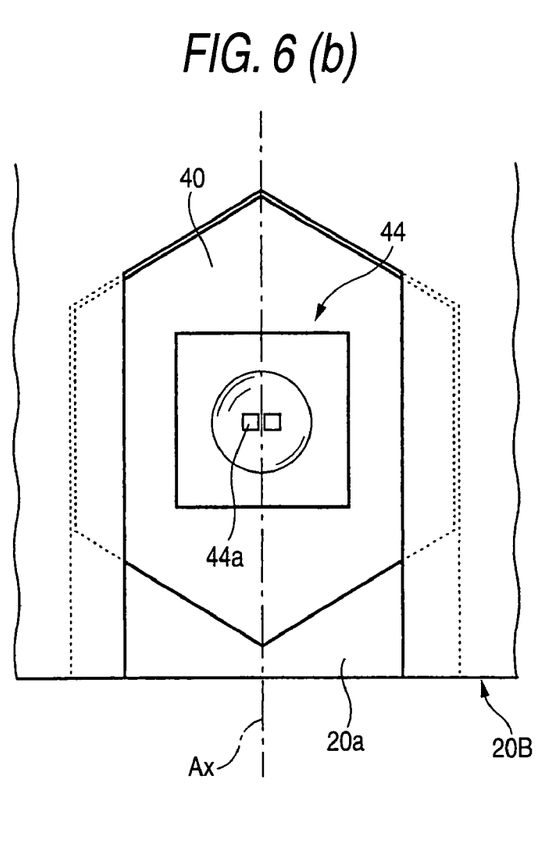
FIG. 6(a) illustrates a detailed view viewing FIG. 4 from a VIa direction.
FIG. 6(b) is a detailed view viewing FIG. 4 from a VIb direction.

The light emitting element 34 is a white color light emitting diode having four of light emitting chips 34a of a size of about 0.3 through 1 mm square and is supported by a support plate 40 made of a metal in a regular hexagonal shape as shown by FIG. 6(a) which is a detailed view viewed in a VIa direction of FIG. 4. Further, the light emitting element 34 is fixed to the unit attaching portion 20B of the metal made support member 20 in a state of being arranged upward in the vertical direction such that a center position of the four light emitting chips 34a is disposed on the optical axis Ax. The light emitting element 34 is fixed to the unit attaching portion 20B by press-fitting the support plate 40 to a recess groove portion 20a formed at an upper face of the unit attaching portion 20B. Further, thereby, even when the light emitting element 34 generates heat by lighting the lamp unit 30A, heat is transferred swiftly to the metal made support member 20 by way of the support plate 40 by heat conducting operation.

The reflector 36 is constituted to reflect light from the light emitting element 34 to a front side to be proximate to the optical axis Ax to substantially converge to a vicinity of a rear side focus F of the projecting lens 32. Specifically, a reflecting face 36a of the reflector 36 is set substantially in an elliptical shape in a sectional shape thereof including the optical axis Ax and an eccentricity thereof is set to gradually increase from a vertical section to a horizontal section. Further, the reflecting face 36a substantially converges light from the light emitting element 34 to a position on a slightly front side of the rear focus F.

The reflector 36 is formed with a pair of left and right brackets. Further, the reflector 36 is screwed to be fixed to the unit support member 20 at the two brackets in a state of bringing a lower end portion of a peripheral edge thereof into contact with an upper face of the unit attaching portion 20B of the unit support member 20.

The light control member 38 is formed such that an upper face 38a thereof is extended from the rear side focus F of the projecting lens 32 to a rear side, and a front end edge 38a1 thereof is formed substantially in a shape of a circular arc along a focus face of the rear side focus F of the projecting lens 32.

The upper face 38a of the light control member 38 is formed substantially in a ridge-like shape in a front view of the lamp. That is, a region of the upper face 38a on a left side of the optical axis Ax (right side in front view of lamp) is constituted by a flat face extended horizontally from the optical axis Ax in a left direction, and a region thereof on a right side of the optical axis Ax is constituted by a flat face extended from the optical axis Ax in a skewed lower direction (for example, lower direction by 15°) in the right direction. Further, the upper face 38a is subjected to a reflecting face processing by aluminum vapor deposition or the like, thereby, the upper face 38a is constituted as a reflecting face for hampering straight advancement of a portion of reflected light from the reflecting face 36a of the reflector 36 to reflect upward.

The light control member 38 is formed such that a front end portion thereof is bent to a lower side and made to fixedly support the projecting lens 32 at the front end edge.

A rear end portion of the light control member 38 is formed with a pair of left and right brackets and is screwed to be fixed to the unit support portion 20B at the two brackets. The brackets are screwed to be fixed by screwing together the light control member 38 and the reflector 36 in a state of interposing elastic bushes 42 between the respective brackets and the unit support portion 20B.

Also the lamp units 30B, 30C arranged at the middle stage vertical portion of the vertical panel portion 20A are constructed by a constitution quite similar to that of the lamp unit 30A.

Although a basic constitution of the lamp units 30D, 30E arranged at the lower stage vertical portion of the vertical panel portion 20A is quite similar to that of the lamp unit 30A, a light emitting element 44 constituting a light source thereof differs from the light emitting element 34 of the lamp unit 30A, further, a reflector 46 thereof differs from the reflector 36 of the lamp unit 30A.

That is, the light emitting elements 44 of the respective lamp units 30D, 30E are white color light emitting diodes each having two of light emitting chips 44a of a size of about 0.3 through 1 mm square as shown by FIG. 6(b) which is a detailed view viewed in a VIb direction of FIG. 4, and are supported by the support plates 40 made of a metal in the regular hexagonal shape. Further, the light emitting element 44 is fixed to the unit attaching portion 20B of the metal made support member 20 in a state of being arranged upward in the vertical direction such that a center position of the two light emitting chips 44a is disposed on the optical axis Ax. Also the light emitting element 44 is fixed to the unit attaching portion 20B by press-fitting the support plate 40 to the recess groove portion 20a formed at the upper face of the unit attaching portion 20B from the front side. Further, thereby, even when the light emitting elements 44 generate heat by lighting the respective lamp units 30D, 30E, the heat is swiftly transferred to the metal made support member 20 by way of the support plate 40 by heat conducting operation.

The respective light emitting chips 44a of the light emitting element 44 are constituted as light emitting chips of a high brightness type for emitting light by a brightness higher than that of the respective light emitting chips 34a of the light emitting element 34. Therefore, according to the light emitting element 44, a heat resistance and a power consumption are larger than those of the light emitting element 34, thereby, also a heat generating amount thereof is larger than a heat generating amount of the light emitting element 34.

Further, similar to the reflecting face 36a in the lamp unit 30A, according to the reflectors 46 of the respective lamp units 30D, 30E, reflecting faces 46a thereof are set to substantially an elliptical shape in a sectional shape thereof including the optical axis Ax, an eccentricity thereof is set to gradually increase from a vertical section to a horizontal section, however, a change in the eccentricity is set to a value smaller than that in the case of the reflecting face 36a. Further, thereby, a property of the reflector 46 for converging light from the light emitting element 44 to a vicinity of the rear side focus F of the projecting lens 32 is promoted.

Figure 8:
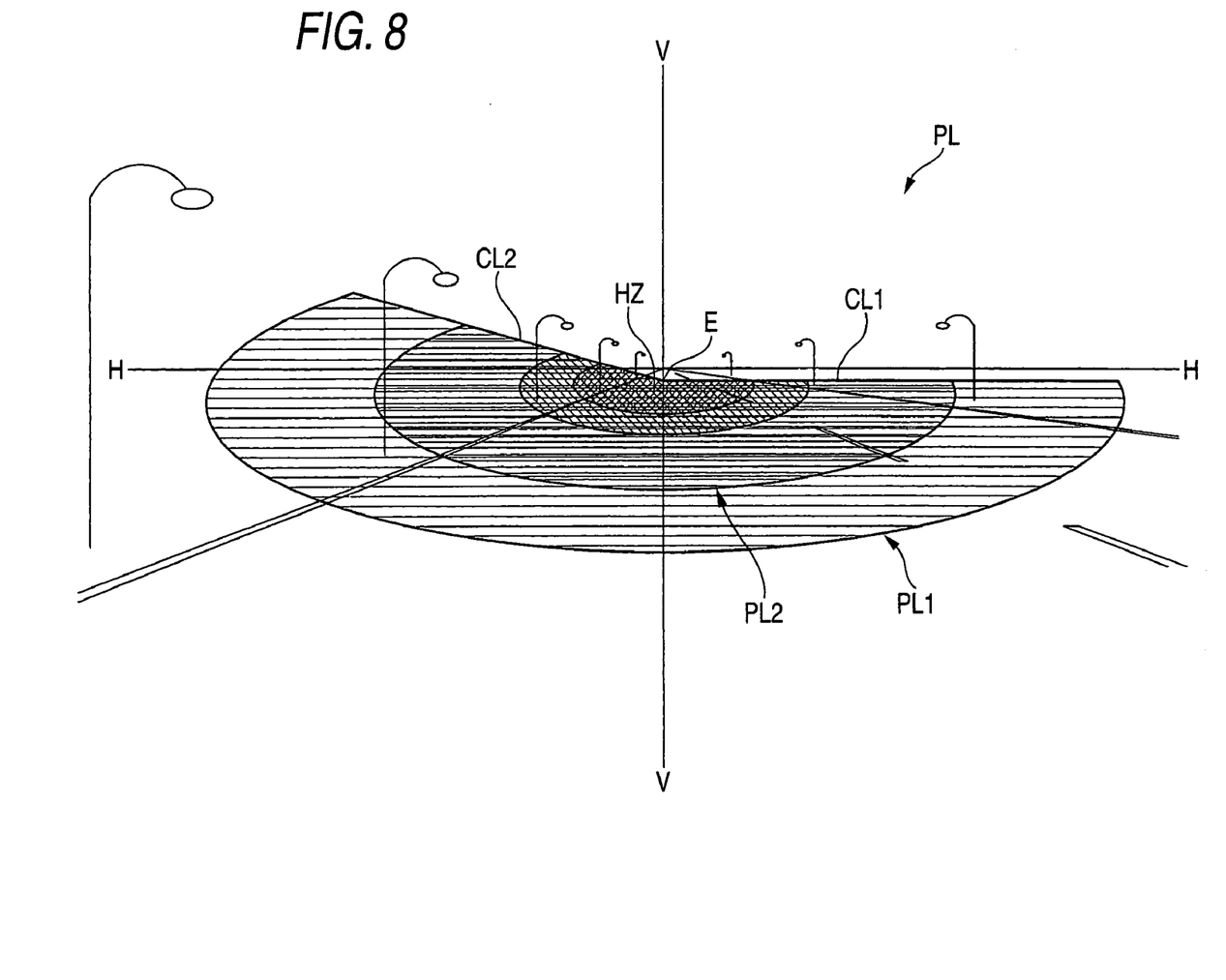
FIG. 8 is a diagram perspectively showing a light distribution pattern for a low beam formed on an imaginary vertical screen arranged at a position frontward from the lamp by 25 m by irradiating light from the vehicle lamp.

FIG. 8 is a diagram perspectively showing a light distribution pattern for a low beam formed on an imaginary vertical screen arranged at a position frontward from the lamp by 25 m by light irradiated to the front side by the vehicle headlamp 10 according to the embodiment.

As shown by the drawing, the light distribution pattern PL for the low beam is a light distribution pattern of a left light distribution including a horizontal cutoff line CL1 and a skewed cutoff line CL2 rising from the horizontal cutoff line CL1 by a predetermined angle (for example, 15°) at an upper end edge thereof, and a position of an elbow point E constituting an intersection of the two cutoff lines CL1, CL2 is set to a portion downward from H-V constituting a vanishing point in the lamp front direction by about 0.5 through 0.6°. Further, the light distribution pattern PL for the low beam is formed with a hot zone HZ constituting a high light intensity region to surround the elbow point E.

The light distribution pattern PL for the low beam is formed as a synthesized light distribution pattern of three scattering light distribution pattern PL1 formed by irradiating light from the three lamp units 30A, 30B, 30C and two converging light distribution pattern PL2 formed by irradiating light from the two lamp units 30D, 30E.

Figure 9:
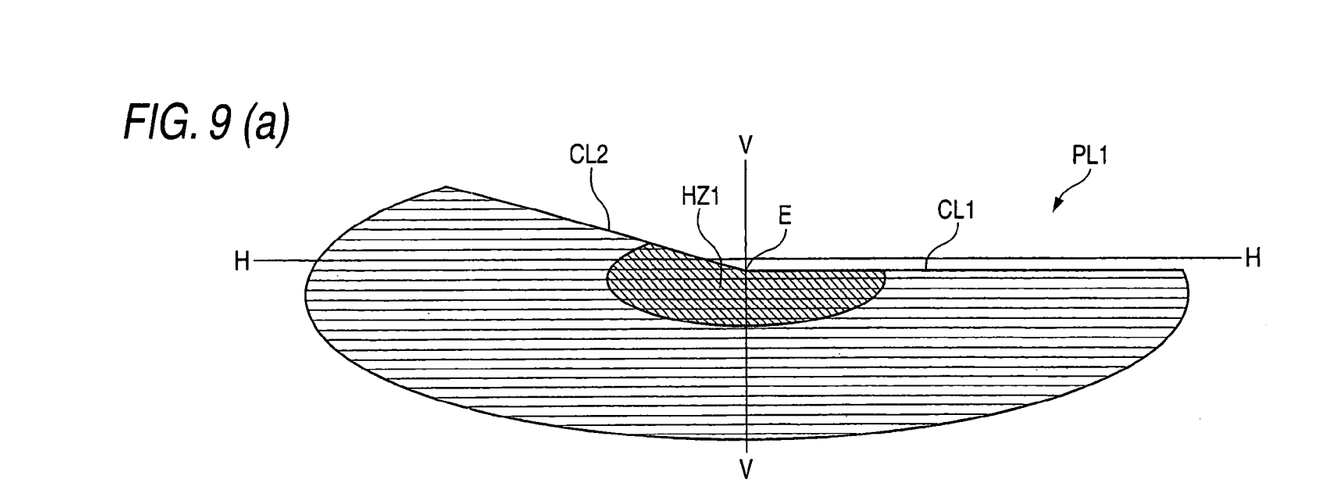
FIG. 9(a) illustrates diagrams showing a scattering light distribution pattern.
FIG. 9(b) illustrates diagrams showing a converging light distribution pattern.

As shown by FIG. 9(a), the scattering light distribution pattern PL1 formed by irradiating light from the respective lamp units 30A, 30B, 30C is formed with the horizontal and skewed cutoff lines CL1, CL2 as an inverted projected image of the front end edge 38a1 of the upper face 38a of the light control member 38. At this occasion, the upper face 38a is constituted as the reflecting face and therefore, light to be emitted upward from the projecting lens 32 in reflected light from the reflecting face 36a of the reflector 36 as indicated by a two-dotted chain line in FIG. 5 is utilized as light emitted downward from the projecting lens 32 as indicated by a bold line in the drawing.

Further, as shown by FIG. 9(b), also the converging light distribution pattern PL2 formed by irradiating light from the respective lamp units 30D, 30E is formed similar to the scattering light distribution pattern PL1. However, whereas the light emitting element 34 is constituted to include four of the light emitting chips 34a, the light emitting elements 44 of the respective lamp units 30D, 30E are constituted to include two of the light emitting chips 44a of the high brightness type, further, the reflector 46 is provided with a property of converging light to the vicinity of the rear side focus F of the projecting lens 32 more than the reflector 36 and therefore, the converging light distribution pattern PL2 becomes a light distribution pattern considerably smaller and brighter than the scattering light distribution pattern PL1 and also a hot zone HZ2 thereof is smaller and brighter than the hot zone HZ1 of the middle scattering light distribution pattern PL1.

Figure 7:
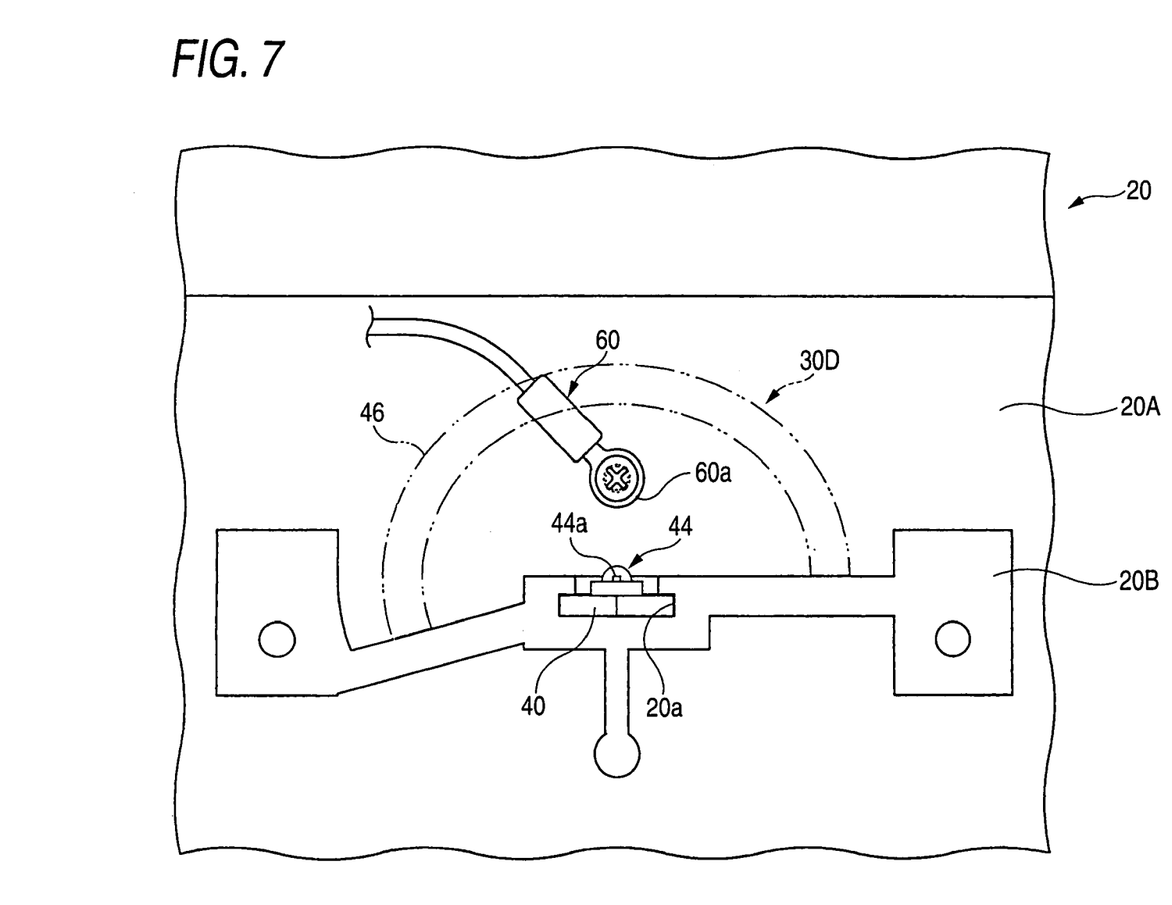
FIG. 7 is a detailed view of a VII portion of FIG. 4.

FIG. 7 is a detailed view of a VII portion of FIG. 4.

As shown also in the drawing, in the vehicle lamp 10 according to the embodiment, a temperature sensor 60 is provided at a vicinity of one of the lamp unit 30D in the lamp units 30D, 30E arranged at the lower stage vertical portion of the vertical panel portion 20A. Further, according to the embodiment, it is on the premise that it is previously confirmed by an experiment or the like that temperatures of the light emitting elements 44 of the lamp units 30D, 30E arranged at the lower stage vertical portion of the vertical panel portion 20A become the highest among the five lamp units 30A to 30E.

The temperature sensor 60 is a platinum thin film temperature sensor and is screwed to be fixed to the vertical panel portion 20A at a metal terminal portion 60a by bringing the metal terminal portion 60a in a shape of a grommet integrally formed with a sensor main body in substantially a cylindrical shape thereof into face contact with the vertical panel portion 20A. Further, the temperature sensor 60 detects a temperature of the vertical panel portion 20A at a position of fixing the metal terminal portion 60a. At that occasion, the position of fixing the metal terminal portion 60a is set to a position at an upward vicinity of the recess groove portion 20a of the unit attaching portion 20B fixed with the lamp unit 30D (that is, a position at an upward vicinity of the light emitting element 44).

Next, operation and effect of the embodiment will be explained.

The vehicle lamp 10 according to the embodiment is constructed by the constitution in which the three lamp units 30A, 30B 30C constituting the light sources by the light emitting elements 34 and the two lamp units 30D, 30E constituting the light sources by the light emitting elements 44 are contained at inside of the lamp chamber formed by the lamp body 12 and the light transmitting cover 14 attached to the front end opening portion of the lamp body 12, the five lamp units 30A through 30E are supported by the common metal made support member 20 and therefore, even when the light emitting elements 34, 44 generate heat by lighting the respective lamp units 30A through 30E, the heat is transferred to the metal made support member 20 having the large heat capacity by heat conducting operation, thereby, the temperature rise of the respective light emitting elements 34, 44 is restrained.

At this occasion, in the vehicle lamp 10 according to the embodiment, the heat generating amount of the light emitting elements 44 of the lamp units 30D, 30E is larger than that of the heat generating elements 34 of the lamp units 30A, 30B, 30C, in two sets of the lamp units 30B, 30C and the lamp units 34D, 34E contiguous to each other in the up and down direction, the lamp units 30D, 30E are arranged on lower sides of the lamp units 30B, 30C and therefore, the following and effect can be achieved.

That is, when the lamp units 30D, 30E are lighted, the temperature of the light emitting elements 44 is elevated by heat generated by the light emitting element 44 per se, in this case, when the lamp units 30D, 30E are assumedly arranged on upper sides of the lamp units 30B, 30C, heat transferred from the light emitting elements 34 to the metal made support member 20 by lighting the lamp units 30B, 30C is transferred upward and therefore, the temperature of the light emitting elements 44 of the lamp units 30D, 30E is elevated also by the heat.

In contrast thereto, in the vehicle lamp 10 according to the embodiment, the lamp units 30D, 30E are arranged on the lower sides of the lamp units 30B, 30C and therefore, the temperature of the heat generating elements 44 of the lamp units 30D, 30E is hardly elevated by the heat transferred from the light emitting elements 34 of the lamp units 30B, 30C to the metal made support member 20. Therefore, the temperature of the light emitting elements 44 of the lamp units 30D, 30E can be prevented from being abnormally elevated beforehand, and it can be restrained that the light source light flux of the light emitting element 44 is reduced or the emitted light color is changed.

In this way, according to the embodiment, the temperature rise of the light emitting elements 34, 44 of the respective lamp units 30A through 30E can be restrained. Further, thereby, with regard to portions of the five lamp units 30A through 30E, it can be restrained that the light source light flux of the light emitting elements 34, 44 is reduced or the emitted light color is changed.

Further, according to the embodiment, in the five lamp units 30A through 30E, the temperature sensor 60 is provided at a vicinity of the one lamp unit 30D in the lamp units 30D, 30E at which the temperatures of the light emitting elements 34, 44 become the highest and therefore, a current can be supplied to the respective lamp units 30A through 30E by predetermined current values in accordance with the detecting temperature of the temperature sensor 60. Further, thereby, after minimizing a number of pieces of installing the temperature sensor 60, it can be prevented beforehand that the temperatures of the light emitting elements 34, 44 of the respective lamp units 30A through 30E are abnormally elevated.

Further, according to the embodiment, the lamp unit 30B and the lamp unit 30D constitute one set of the lamp units as "a first and a second lamp unit having different heat generating amounts of light emitting elements" "arranged contiguously to each other in an up and down direction", in this case, the lamp unit 30B constitutes "the second lamp unit having a relatively small heat generating amount" and the lamp unit 30D is constituted to be arranged on the lower side of the lamp unit 30B as "the first lamp unit having a relatively large heat generating amount". Further, according to the embodiment, the lamp unit 30C and the lamp unit 30E constitute another set of the lamp units as "a first and a second lamp unit having different heat generating amounts of light emitting elements" "arranged contiguously to each other in the up and down direction", in this case, the lamp unit 30C constitutes "the second lamp unit having a relatively small heat generating amount" and the lamp unit 30E is constituted to be arranged on the lower side of the lamp unit 30C as "the first lamp unit having a relatively large heat generating amount".

Meanwhile, although according to the embodiment, there is constructed a constitution in which the temperature sensor 60 comprises the platinum thin film temperature sensor and is screwed to be fixed to the vertical panel portion 20A at the metal terminal portion 60a, a temperature sensor other than the platinum thin film temperature sensor can naturally be used as the temperature sensor 60 and also with regard to a structure of attaching the temperature sensor to the vertical panel portion 20A, an attaching structure other than the structure of screwing to fix the temperature sensor thereto can also be adopted.

Further, although according to the embodiment, an explanation has been given such that the temperature sensor 60 is provided at a vicinity of the lamp unit 30D, the pair of lamp units 30D, 30E arranged at the lower stage vertical portion of the vertical panel portion 20A are under a similar thermal environment and therefore, even when the temperature sensor 60 is constituted to be provided at a vicinity of the lamp unit 30E, operation and effect similar to those of the above-described embodiment can be achieved.

Further, although according to the embodiment, an explanation has been given on the premise that it is previously confirmed by an experiment or the like that the temperature of the light emitting elements 44 of the lamp units 30D, 30E arranged at the lower stage vertical portion of the vertical panel portion 20A becomes the highest among the five lamp units 30A to 30E, the lamp units 30D, 30E including the light emitting elements 44 having the relatively large heat generating amount are arranged on the lower sides of the lamp units 30B, 30C including the light emitting elements 34 having the relatively small heat generating amount, thereby, a temperature distribution of the metal made support member 20 is made to be uniform and therefore, the temperature of the light emitting elements 34 of the lamp units 30A, 30B, 30C can be higher than that of the light emitting elements 44 of the lamp units 30D, 30E depending on conditions of specification of the light emitting elements 34, 44 and a wall thickness or a material or the like of the metal made support member 20. In that case, the temperature of the light emitting element 34 of the lamp unit 30A arranged at the upper stage vertical portion of the vertical panel portion 20A becomes the highest and therefore, the temperature sensor 60 may be provided at a vicinity of the lamp unit 30A.

Although according to the embodiment, an explanation has been given such that the five lamp unit 30A through 30E are provided to be arranged substantially in the regular pentagonal shape, a number of pieces of the lamp units other than the above-described or an arrangement thereof can naturally be adopted.

Further, although according to the embodiment, an explanation has been given such that all of the five lamp units 30A through 30E are constituted as the lamp units of the projector type, a lamp constitution other than the constitution can naturally be adopted.

Figure 10:
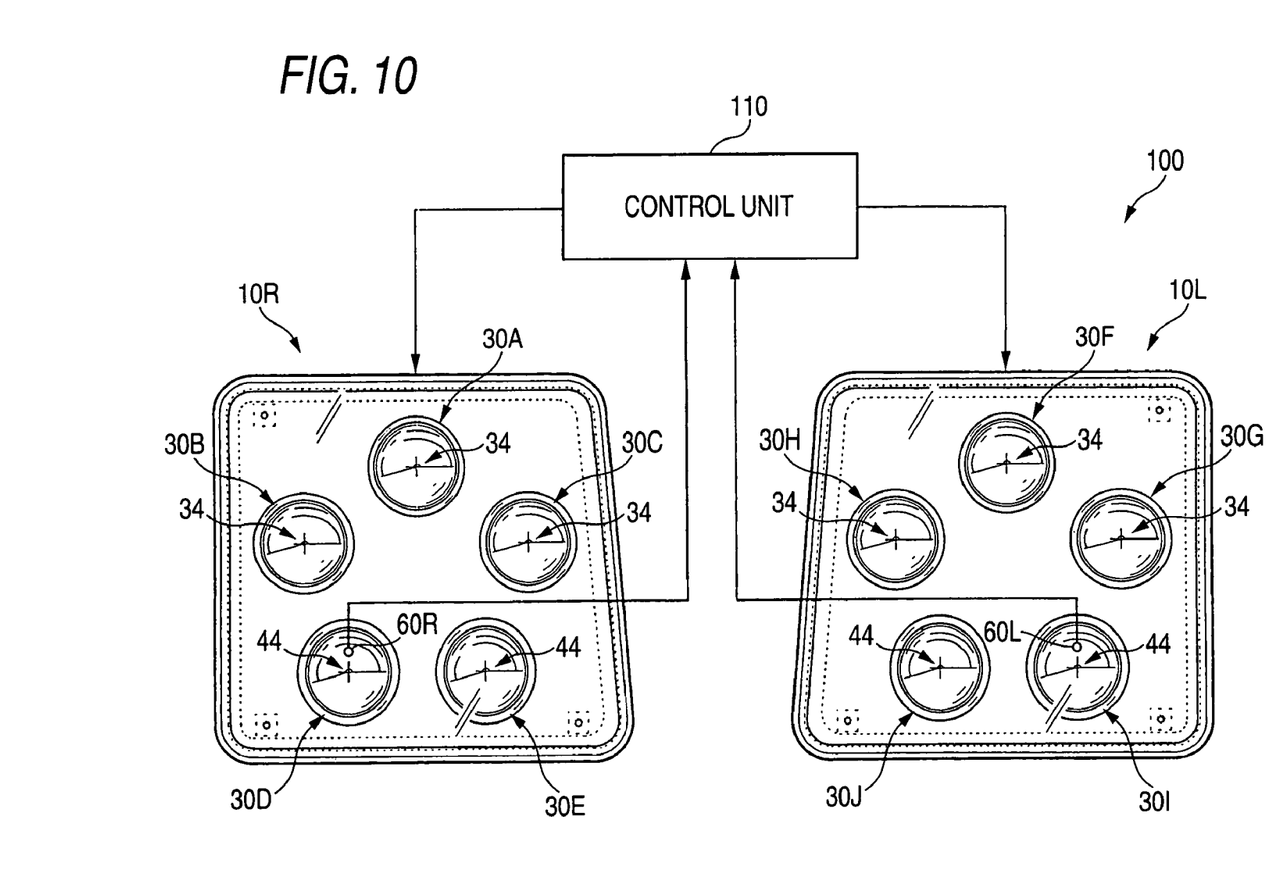
FIG. 10 is a block diagram showing a vehicle lamp system including the lamp according to the exemplary embodiment as a right side lamp.

FIG. 10 is a block diagram showing a vehicle lamp system 100 having the vehicle lamp 10 according to the embodiment as a right side lamp 10R.

The vehicle lamp system 100 is constituted by including the right side lamp 10R, a left side lamp 10L constituted as a headlamp provided on a left side portion of the front end of the vehicle body, and a control unit 110 as a current controller.

The left side lamp 10L is provided with a structure constituted by inverting the right side lamp 10R in a left and right direction, and respective constitutions per se of the five lamp units 30F, 30G, 30H, 30I, 30J in correspondence with the five lamp units 30A, 30B, 30C, 30D, 30E constituting the right side lamp 10R are constructed by constitutions of parallelly moving the respective lamp units 30A through 30E.

In the left side lamp 10L, a left side temperature sensor 60L is provided at a vicinity of the lamp unit 30I (or 30J) at which the temperatures of the light emitting elements 34, 44 become the highest, and in the right side lamp 10R, a right side temperature sensor 60R is provided at the vicinity of the lamp unit 30D (or 30E) at which the temperatures of the light emitting elements 34, 44 become the highest. Further, detecting temperatures of the left side temperature sensor 60L and the right side temperature sensor 60R are inputted to a control unit 110.

Further, the control unit 110 sets currents supplied to respective vehicle lamps 10L, 10R to a predetermined current value in accordance with a value of a higher one of the detecting temperature of the left side temperature sensor 60L and the detecting temperature of the right side temperature sensor 60R.

By adopting such a constitution, brightnesses of the left side lamp 10L and the right side lamp 10R can be made to be uniform and therefore, a concern of giving a strange feeling to a driver of a vehicle of one's own, a driver of a vehicle running on an opposed lane or a driver of a succeeding vehicle or the like can be eliminated.

Figure 11:
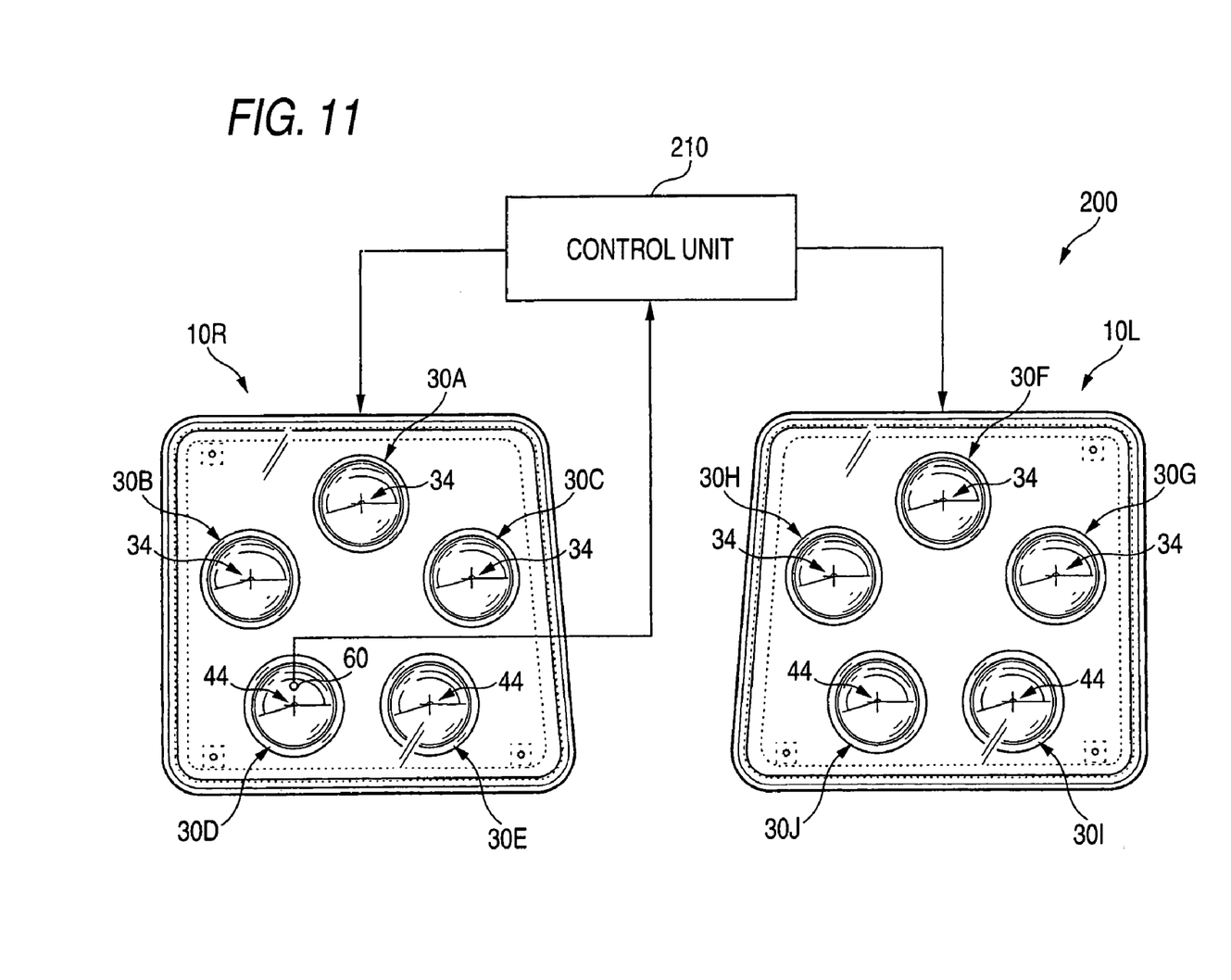
FIG. 11 is a block diagram showing a modified example of the vehicle lamp system.

FIG. 11 is a block diagram showing a modified example of the vehicle lamp system 100.

A vehicle lamp system 200 according to the modified example is constructed by a constitution including the left side lamp 10L, the right side lamp 10R, and a control unit 210 similar to the vehicle lamp system 100.

According to the modified example, the temperature sensor 60 is provided only at one portion at a vicinity of the lamp unit 30D (30E) of the right side lamp 10R at which the temperatures of the light emitting elements 34, 44 become the highest in the five lamp units 30F, 30G, 30H, 30I, 30J constituting the left side lamp 10L and the five lamp units 30A, 30B, 30C, 30D, 30E constituting the right side lamp 10R.

Further, according to the modified example, it is on the premise that it is confirmed that a temperature environment at inside of an engine compartment is previously grasped and an ambient temperature at a surrounding of the right side lamp 10R is higher than an ambient temperature at a surrounding of the left side lamp 10L.

Further, a detecting temperature of the temperature sensor 60 is inputted to the control unit 210 and the control unit 210 sets currents supplied to the respective vehicle lamps 10L, 10R to a predetermined current value in accordance with the detecting temperature of the temperature sensor 60.

By adopting such a constitution, the brightnesses of the left side lamp 10L and the right side lamp 10R can be made to be uniform and therefore, the concern of giving a strange feeling to a driver of a vehicle of one's own or a driver of a vehicle running on an opposed lane or a driver of a succeeding vehicle or the like can be eliminated.

Further, by adopting such a constitution, a necessary number of pieces of installing the temperature sensors 60 can be minimized.

Further, when it is confirmed that in the case in which the ambient temperature at the surrounding of the left side lamp 10L is higher than the ambient temperature at the surrounding of the right lamp 10R, when the temperature sensor 60 is provided at a vicinity of the lamp unit 30I (or 30J) of the left side lamp 10L, operation and effect similar to those of the modified example can be achieved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:
   a plurality of lamp units supported by a common support member, each of the lamp units including a light emitting element as a light source; wherein
   the plurality of lamp units include a first lamp unit and a second lamp unit,
   the first lamp unit has a larger heat generating amount than the second lamp unit, and
   the first lamp unit is arranged on a lower side of the second lamp unit.

2. The vehicle lamp according to claim 1, wherein the first and the second lamp units are arranged to be contiguous to each other in an up and down direction.

3. The vehicle lamp according to claim 1, wherein the support member is made of metal.

4. The vehicle lamp according to claim 1, further comprising: a temperature sensor provided at a vicinity of a lamp unit of the plurality of lamp units, wherein the lamp unit has a light emitting element whose temperature becomes the highest.

5. A vehicle lamp system comprising the vehicle lamps according to claim 1 on left and right sides of a vehicle body, the vehicle lamp system comprising:
- a left side temperature sensor provided at a vicinity of the lamp unit at which a temperature of the light emitting element becomes the highest in the plurality of lamp units constituting the vehicle lamp on the left side;
- a right side temperature sensor provided at a vicinity of the lamp unit at which a temperature of the light emitting element becomes the highest in the plurality of lamp units constituting the vehicle lamp on the right side; and
- a current controller that controls a current supplied to the respective vehicle lamps in accordance with a value of a higher one of a detecting temperature of the left side temperature sensor and a detecting temperature of the right side temperature sensor.

6. A vehicle lamp system comprising the vehicle lamps according to claim 1 on left and right sides of a vehicle body, the vehicle lamp system comprising:
- a temperature sensor provided at a vicinity of the lamp unit at which a temperature of the light emitting element becomes the highest in the plurality of lamp units constituting the vehicle lamp on the left side and the plurality of lamp units constituting the vehicle lamp on the right side; and
- a current controller that controls a current supplied to the respective vehicle lamps in accordance with a detecting temperature of the temperature sensor.

7. The vehicle lamp according to claim 1, wherein the light emitting element in the first lamp unit is configured to emit light with higher brightness than the light emitting element in the second lamp unit.

8. The vehicle lamp according to claim 1, wherein the first lamp unit comprises a projecting lens, and the second lamp unit comprises a projection lens.

* * * * *